(12) United States Patent
Yu

(10) Patent No.: US 8,573,838 B2
(45) Date of Patent: Nov. 5, 2013

(54) NON-MERCURY NON-ELECTRONIC CLINICAL THERMOMETER WITH A PROTECTIVE STRUCTURE

(75) Inventor: Chu-Yih Yu, Taipei Hsien (TW)

(73) Assignee: Mesure Technology Co., Ltd., San Chung, Taipei Hsien (TW)

( * ) Notice: Subject to any disclaimer, the term of this patent is extended or adjusted under 35 U.S.C. 154(b) by 0 days.

(21) Appl. No.: 13/324,891

(22) Filed: Dec. 13, 2011

(65) Prior Publication Data

US 2012/0147925 A1 Jun. 14, 2012

(30) Foreign Application Priority Data

Dec. 14, 2010 (TW) ................................ 99143800 A

(51) Int. Cl.
*G01K 11/00* (2006.01)
*G01K 13/12* (2006.01)

(52) U.S. Cl.
USPC ........................... 374/162; 374/100; 116/216

(58) Field of Classification Search
USPC ......................................................... 374/162
See application file for complete search history.

(56) References Cited

U.S. PATENT DOCUMENTS

| | | | | |
|---|---|---|---|---|
| 3,955,420 A | * | 5/1976 | Parker | 374/162 |
| 4,629,335 A | * | 12/1986 | Eckstein | 374/142 |
| 4,654,623 A | * | 3/1987 | Steinschulte | 338/28 |
| 5,709,472 A | * | 1/1998 | Prusik et al. | 374/106 |
| 5,873,892 A | * | 2/1999 | Cohen | 606/234 |
| 6,042,264 A | * | 3/2000 | Prusik et al. | 374/106 |
| 6,264,049 B1 | * | 7/2001 | Shteynberg | 215/11.2 |
| 6,544,925 B1 | * | 4/2003 | Prusik et al. | 503/201 |
| 7,350,973 B2 | * | 4/2008 | Craig et al. | 374/162 |
| 2002/0157464 A1 | * | 10/2002 | Rait | 73/293 |
| 2004/0076219 A1 | * | 4/2004 | Madison et al. | 374/159 |
| 2006/0291534 A1 | * | 12/2006 | Pavlos | 374/165 |
| 2008/0072813 A1 | * | 3/2008 | Parker et al. | 116/216 |
| 2008/0229602 A1 | * | 9/2008 | Herr et al. | 33/722 |
| 2009/0217864 A1 | * | 9/2009 | Stewart et al. | 116/216 |
| 2011/0121094 A1 | * | 5/2011 | Burney | 239/24 |

* cited by examiner

*Primary Examiner* — Lisa Caputo
*Assistant Examiner* — Jamel Williams
(74) *Attorney, Agent, or Firm* — McClure, Qualey & Rodack, LLP

(57) ABSTRACT

A thermometer includes a protective structure and a tip member with a thermal contact surface secured to the protective structure. A heat conductive layer includes a sensing portion disposed in the tip member and a temperature indication portion disposed in the protective structure. A structure with temperature indication markings is laid out along the temperature indication portion. A reversible temperature-sensitive color changing layer is formed on the temperature indication portion to overlap the structure of the temperature indication markings, in which the sensing portion is adapted for sensing the thermal contact surface to conduct heat flow to the reversible temperature-sensitive color changing layer, producing a sensed temperature and a color changing zone of the reversible temperature-sensitive color changing layer in response to the sensed temperature thereby exhibiting a corresponding temperature value.

8 Claims, 5 Drawing Sheets

NON-MERCURY NON-ELECTRONIC CLINICAL THERMOMETER WITH A PROTECTIVE STRUCTURE

BACKGROUND OF THE INVENTION

1. Field of the Invention

The invention relates to the field of thermometers, and more particularly to the field of non-mercury non-electronic clinical thermometers with a protective structure.

2. Description of the Related Art

For use in a health care field, a wide variety of materials and methods are available for detecting temperature and temperature changes. The most common example of a temperature indicating device is the mercury bulb thermometer. Bulb thermometers rely on the simple principle that the volume of a liquid expands upon heating and diminishes when cooled. Mercury bulb thermometers have become undesirable since mercury is highly toxic. In fact, many countries are actively banning or limiting the use of mercury and mercury thermometers.

Electronic thermometers generally offer a great number of advantages over conventional glass and mercury thermometers. Among the advantages of electronic thermometers are a digital temperature display to eliminate temperature reading errors; and with proper circuit design and calibration, higher accuracy and resolution is possible with accurate measurement and display of tenths of a degree Fahrenheit being easily attainable.

However, the above electronic thermometers are expensive since they require circuitry and/or processor chip. Furthermore, such electronic thermometers typically use a chemical battery as a power supply. In general, the electronic thermometers are idle for a long time since patients only use the electronic thermometers while they are sick or feel uncomfortable. Thus such electronic thermometers employing a chemical battery as a power supply are not environmentally friendly.

SUMMARY OF THE INVENTION

An exemplary embodiment of the present invention overcomes the above-described problems by providing a thermometer includes a protective structure and a tip member with a thermal contact surface secured to the protective structure. A heat conductive layer includes a sensing portion disposed in the tip member and a temperature indication portion disposed in the protective structure. A structure with temperature indication markings is laid out along the temperature indication portion. A reversible temperature-sensitive color changing layer is formed on the temperature indication portion to overlap the structure of the temperature indication markings, in which the sensing portion is adapted for sensing the thermal contact surface to conduct heat flow to the reversible temperature-sensitive color changing layer, producing a sensed temperature and a color changing zone of the reversible temperature-sensitive color changing layer in response to the sensed temperature thereby exhibiting a corresponding temperature value.

DESCRIPTION OF THE DRAWINGS

The present invention will be described by way of exemplary embodiments, but not limitations, illustrated in the accompanying drawings in which like references denote similar elements, and in which.

DETAILED DESCRIPTION OF THE INVENTION

Figure 1:
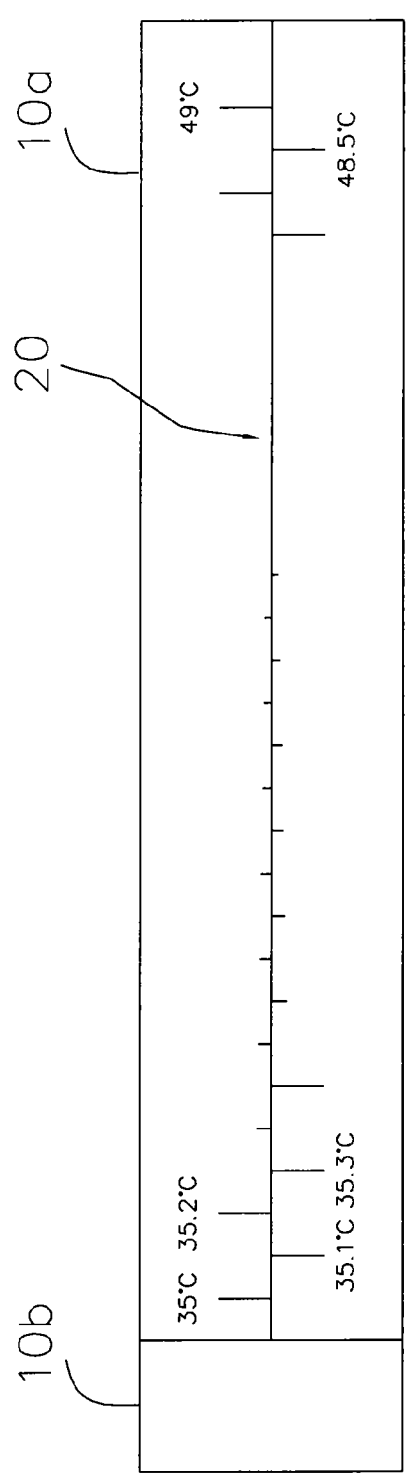
FIG. 1 is a schematic view of a heat conductive layer of a non-mercury non-electronic clinical thermometer according to an exemplary embodiment of the invention.
Figure 2:
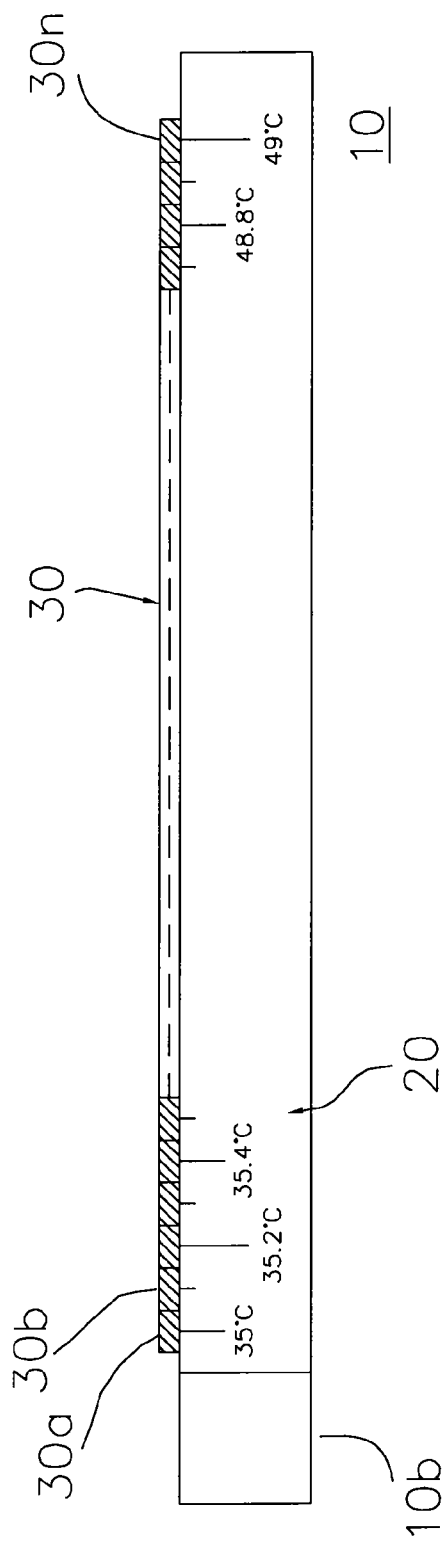
FIG. 2 is schematic view of a reversible temperature-sensitive color changing layer of the thermometer according to an exemplary embodiment of the invention.
Figure 3:
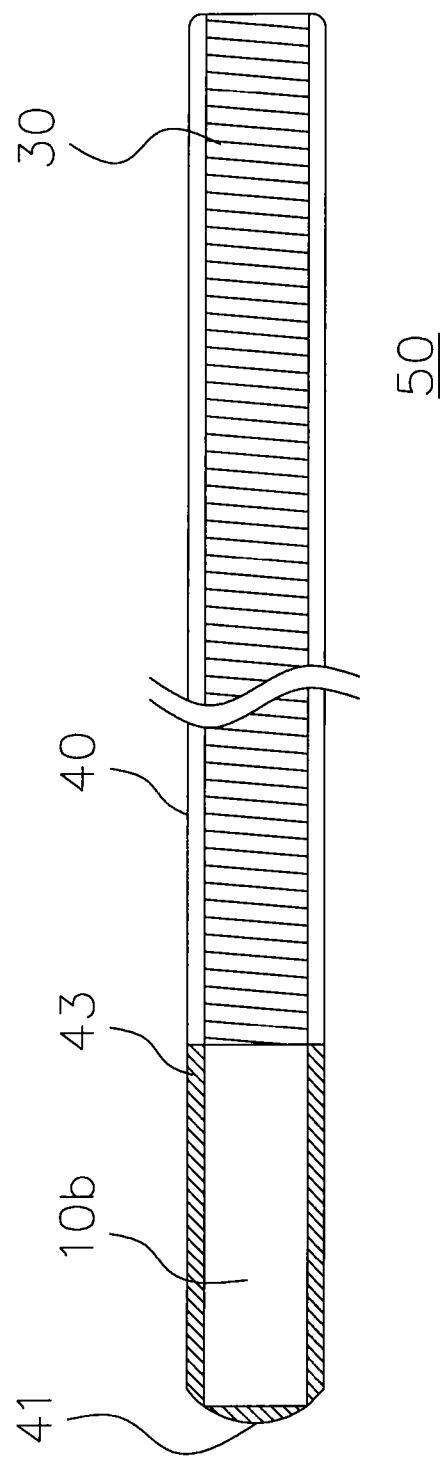
FIG. 3 is a schematic view of the thermometer according to an exemplary embodiment of the invention.

Referring to FIGS. 1 through 3, an embodiment of a thermometer 50 is illustrated. Thermometer 50 comprises a protective structure 40, preferably, made of a transparent material such as a glass or a plastic material. Protective structure 40 may be a hollow body. A tip member 41 has a thermal contact surface 43 secured to protective structure 40. In general, tip member 41 may be a hollow tubular cylinder made of metal such that a certain amount of heat capacitance could be reduced. Although optional, tip member comprises a rounded front end and its surface is preferably made of a soft material. Furthermore, heat conductive glue can be filled into the tip member 43 to secure an end (sensing portion 10b) of a heat conductive layer 10.

Figure 6:
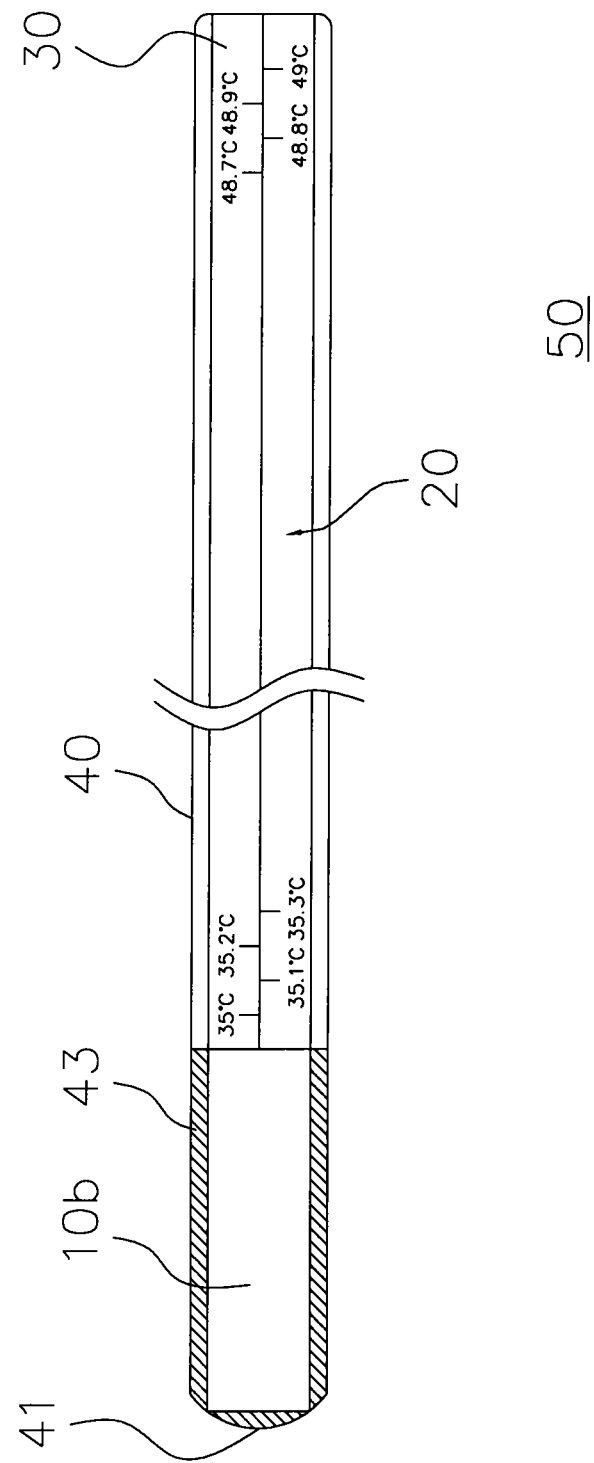
FIG. 6 is a schematic view of a structure with temperature indication markings of the thermometer according to an exemplary embodiment of the invention.

Next, as shown in FIGS. 1 and 6, heat conductive layer is made up of a sensing portion 10b disposed in tip member 41 and a temperature indication portion 10a disposed in protective structure 40, generally formed by a heat conducting film made of metal with good thermal conductivity. In one embodiment, sensing portion 10b is formed adjacent to the front end of tip member 41 or its inner wall. The thermometer typically comprises a structure with temperature indication markings laid out along temperature indication portion 10a, such as by means of coating or printing water-proof inks on or above a surface of temperature indication portion 10a of heat conductive layer 10. Although optional, the water-proof inks may be coated or printed on an inner wall or an outer wall of protective structure 40 corresponding to temperature indication portion 10a.

Figure 4:
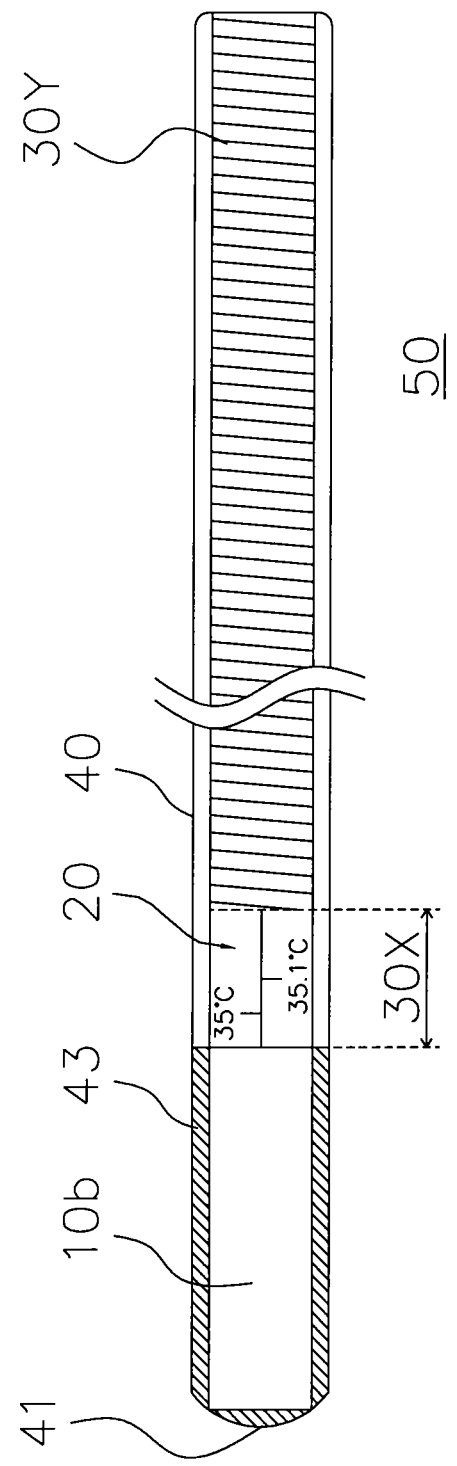
FIG. 4 and FIG. 5 are schematic views of a color change zone of the thermometer according to an exemplary embodiment of the invention.

Turning to FIGS. 2 and 4, a reversible temperature-sensitive color changing layer 30 is formed on temperature indication portion 10a to overlap structure 20 with the temperature indication markings. Specifically, temperature-sensitive color changing layer 30 has a first (original) color state in a prescribed temperature range. The first color state may be chosen to mask structure 20 with the temperature indication markings. In operation, sensing portion 10b is adapted for sensing thermal contact surface 43 of tip member 41 to conduct heat flow to temperature-sensitive color changing layer 30 on temperature indication portion 10a. As best shown in FIG. 4, a temperature is sensed and a color changing zone 30X with a second color state or a transparent state is produced in response to the sensed temperature thereby exhibiting a corresponding temperature value in structure 20 with the temperature indication markings. Furthermore, a remaining portion 30Y of temperature-sensitive color changing layer 30 keeps the original color state still unchanged since the sensed temperature is not enough to cause such state to appear.

Adverting to FIG. 2, temperature indication portion 10a comprises a proximate end adjacent sensing portion 10b and a distal end. Optionally, lower temperature values 30a in structure 20 with the temperature indication markings are marked on the proximate end adjacent sensing portion 10b, and higher temperature values 30n in structure 20 with the temperature indication markings are marked on the distal end. In one example, temperature-sensitive color changing layer 30 is divided into a plurality of blocks 30a-30n and each block corresponds a color-change temperature respectively. When in this configuration, sensing portion 10b is heated to conduct the heat flow to reversible temperature-sensitive color changing layer 30, and then the blocks with the color-change temperatures below the sensed temperature could change their original color state to the second color state or the transparent state such that color changing zone 30X is produced to exhibit the corresponding temperature value. Furthermore, color changing zone 30X may restore the first color state while the sensed temperature is gradually decreased below the color-changing temperatures of the sensed blocks.

Figure 5:
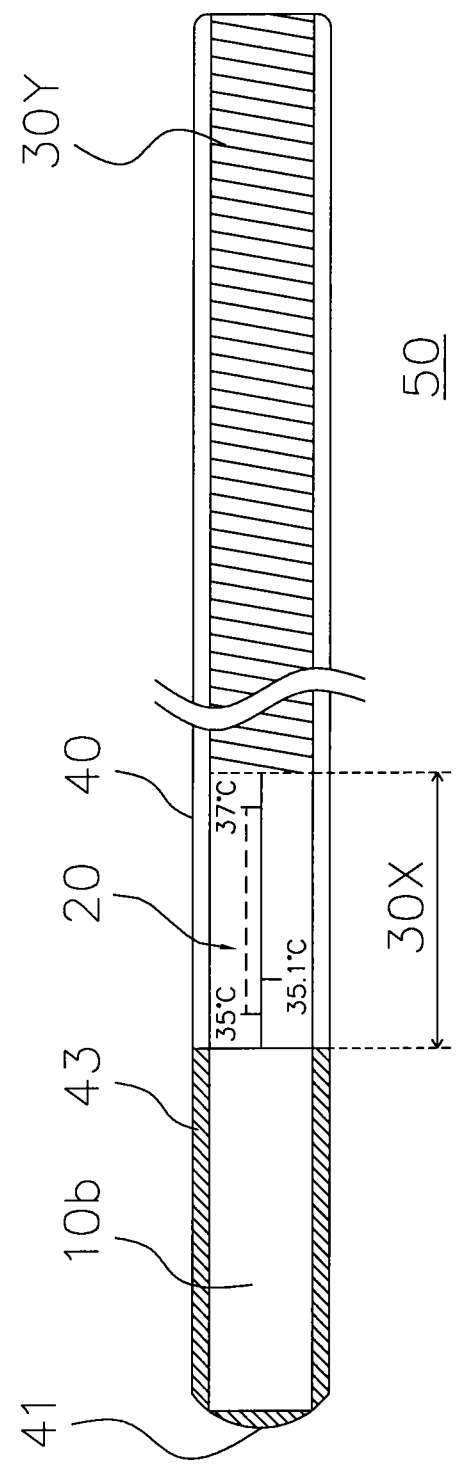

As shown for instance in FIGS. 4 and 5, assuming that the sensed temperature is 37° C., color changing zone 30X comprising the blocks with color-changing temperatures below 37° C. changes its original color state to the transparent state. On the contrary, the remaining portion 30Y comprising the blocks with color-changing temperatures higher 37° C. maintains its original color state to mask the overlapped structure 20 with the temperature indication markings.

FIG. 2 illustrates a method of forming reversible temperature-sensitive color changing layer 30 over heat conductive layer 10. In one example, temperature-sensitive color changing layer 30 is divided into a plurality of blocks 30a-30n and each block may be composed of a dye corresponding to a color-change temperature respectively. Furthermore, reversible temperature-sensitive color changing layer 30 may be a multi-layer structure in which one block may be specified to have more layers for higher color-change temperature. For example, a first reversible temperature-sensitive color changing dye may be coated or printed on an entire surface of temperature indication portion 10a. Then, a second reversible temperature-sensitive color changing dye may be coated or printed on a portion of the surface of temperature indication portion 10a, such as covering the blocks 30b to 30n. In other words, the last reversible temperature-sensitive color changing dye may be coated or printed on the block 30n only. When in this configuration, the block 30a with a lowest color-change temperature has a thinnest thickness and the block 30n with a highest color-change temperature has a thickest thickness. Although optional, the multi-layer structure of reversible temperature-sensitive color changing layer 30 may be composed of several layers with different ingredients or doping densities.

In such thermometers, there is no need to use mercury and chemical battery which are easy to cause environmental pollution.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A thermometer comprising:
a protective structure;
a tip member comprising a thermal contact surface, secured to the protective structure;
a heat conductive layer comprising a sensing portion disposed in the tip member and a temperature indication portion disposed in the protective structure;
a structure with temperature indication markings, being laid out along the temperature indication portion; and
a reversible temperature-sensitive color changing layer, formed on the temperature indication portion to overlap the structure of the temperature indication markings, wherein the sensing portion is adapted for sensing the thermal contact surface to conduct heat flow to the reversible temperature-sensitive color changing layer, producing a sensed temperature and a color changing zone of the reversible temperature-sensitive color changing layer in response to the sensed temperature thereby exhibiting a corresponding temperature value;
wherein the temperature-sensitive color changing layer has a first color state in a prescribed temperature range and the first color state is employed to mask the structure of the temperature indication markings.

2. The thermometer as recited in claim 1 wherein the protective structure comprises a transparent hollow body.

3. The thermometer as recited in claim 2 wherein the protective structure is made of a glass or a plastic material.

4. The thermometer as recited in claim 3 wherein the tip member comprises a hollow tubular cylinder made of metal.

5. The thermometer as recited in claim 1 wherein the tip member is filled with a heat conductive glue to secure the sensing portion of the heat conductive layer thereto.

6. The thermometer as recited in claim 1, wherein the tip member comprises a rounded front end.

7. The thermometer as recited in claim 1, wherein the color changing zone comprising a plurality of blocks with color-changing temperatures has a second color state or a transparent state exhibiting the temperature value, while the sensed temperature is higher than the color-changing temperatures of the blocks in the color changing zone.

8. The thermometer as recited in claim 7, wherein the first color state is restored while the sensed temperature is decreased below the color-changing temperatures.

* * * * *